C. W. JACKSON.
COOKING AND HEATING UTENSIL.
APPLICATION FILED NOV. 1, 1904.
924,162.
Patented June 8, 1909.
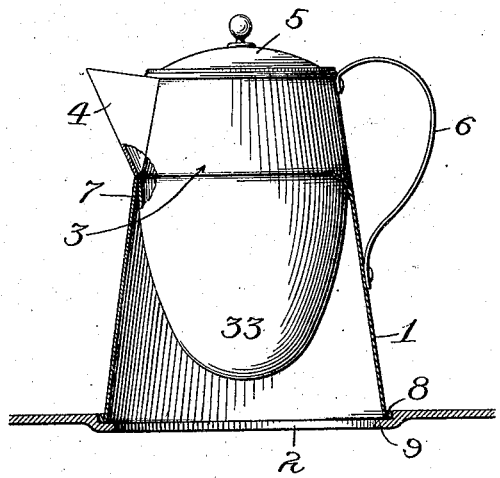
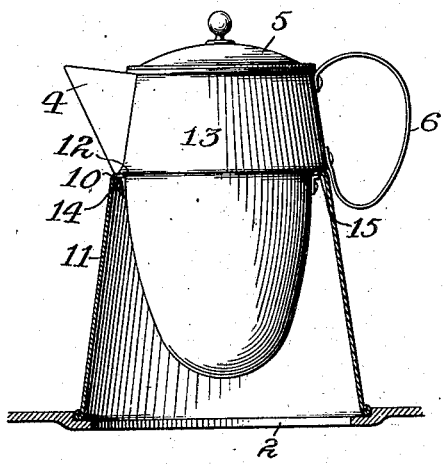
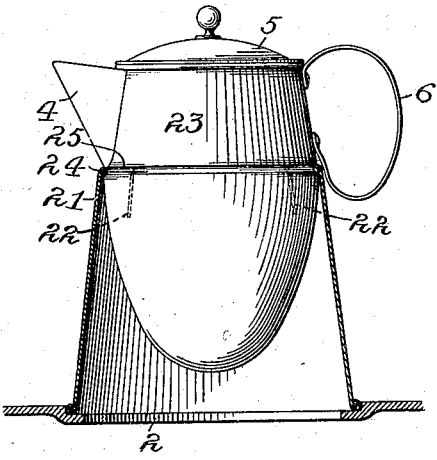
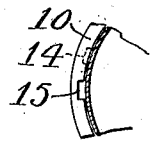
Witnesses:—
Frank L. A. Graham
A. D. Knight
Inventor,
Charles W. Jackson.
by Townsend Bros
His Attys

UNITED STATES PATENT OFFICE.

CHARLES W. JACKSON, OF SAN DIEGO, CALIFORNIA, ASSIGNOR OF ONE-HALF TO ISAAC A. LOTHIAN, OF LOS ANGELES, CALIFORNIA.

COOKING AND HEATING UTENSIL.

No. 924,162.  Specification of Letters Patent.  Patented June 8, 1909.

Application filed November 1, 1904. Serial No. 230,894.

*To all whom it may concern:*

Be it known that I, CHARLES W. JACKSON, a citizen of the United States, residing at San Diego, in the county of San Diego and State of California, have invented a new and useful Cooking and Heating Utensil, of which the following is a specification.

This invention relates particularly to improvements in cooking utensils, being especially adapted for embodiment in coffee-pots or tea-pots, and the object of the invention is to provide means for increasing the effective heating area of the pot and to confine the heat of the stove to as large an area of the pot as possible and prevent the radiation of heat to a great degree. This I do by providing a thimble circular in cross section open at bottom and top and adapted to sit in on or around the ledge of a hole in the top of a stove, and I fit into the same a vessel circular in cross-section and of parabolic or oval form below its support and with an upward extension provided with a cover and with a spout and handle oppositely disposed the spout forming a practical outward extension of the upwardly flaring parabolic bottom portion of the vessel. The purpose of this construction is to afford a superior concentration of the heat onto the vessel and to facilitate pouring. By reason of the parabolic form a further advantage is gained, viz: convenience of manufacture of a seamless vessel where subject to direct action of flame; also the exposure throughout a maximum area to the upwardly directed heat rays.

An object of this invention is to provide improved means for detachably fastening together the upper and lower portions of that class of cooking utensils in which a heat collector is used to collect the heat and direct it against the sides as well as the bottom of the receptacle.

A further object is to so form the receptacle that it may be readily and securely inserted into the top of the heat collector.

The ordinary coffee-pot when heated receives heat by conduction through the bottom of the pot; considerable heat from the stove rises and passes up along the sides of the pot, and although it heats the pot through the side walls to a very slight extent, the heat is mostly radiated, but in the utensils to which the present invention is mainly applicable a large proportion of the heat which otherwise would pass up along the sides of the pot is confined and applied directly to the sides of the pot; moreover, the heat thus confined to a large area of the pot is derived immediately from the fire, there being no intervening stove-plates to obstruct the direct passage of the heat, so that as the heating area of the pot receives its heat directly from the fire and as this area is much greater than the area of the flat bottom of an ordinary pot, the effectiveness of the invention is very great; for example, coffee may be made in a pot of my construction in much less time than in the ordinary pot. Moreover, coffee may be made in such a pot very quickly, even though the fire be much lower than is required for making coffee in the pot of the ordinary construction.

The accompanying drawings illustrate the invention, and referring thereto:— Figure 1 is a sectional view through the pot, part being shown in elevation, and the stove-top being also shown in section. This view illustrates one form in which the receptacle is made in one piece. Fig. 2 is a view similar to Fig. 1 showing a construction in which the receptacle is made removable from the thimble. Fig. 2$^a$ is a detail plan of the detachable fastening. Fig. 3 is a view similar to Fig 2 showing another form of detachable fastening of the receptacle to the thimble.

The invention comprises a thimble which is preferably frusto-conical or downwardly-flaring in form, which is adapted to rest upon the stove-top in the place over the hole; the receptacle for the coffee or other material to be cooked or boiled comprises an oval or rounded pot or cup which projects into the thimble.

In the form shown in Fig. 1, 1 designates a thimble, the lower edge of which is adapted to rest upon the stove-top 2 so that the interior of the thimble communicates with the interior of the stove through the hole of the stove-top. 3 designates a receptacle, the lower portion of which indicated at 33 is oval or rounded, as shown, and which projects nearly to the bottom of the thimble. The oval portion at its greatest diameter closely fits the upper part of the thimble 1.

The thimble 1 is secured as by solder 7, at its upper end, to the portion of receptacle 3 of greatest diameter and extends downward around, but out of contact with, the rounded bottom portion of the receptacle. The receptacle is preferably continued upward so as to present an exterior surface which is practically a continuation of the thimble 1, or, as shown, the thimble 1 may be continued upward to form the upper part of the receptacle. The upper part of the receptacle 3 may have a spout 4, and a lid 5 of any preferred construction, while a handle 6 may have its upper end attached to the upper part of the receptacle 3 and its lower part may be attached to an intermediate part of the thimble 1.

When the utensil is placed upon the stove, as indicated in Fig. 1, it will be noted that the oval-shaped part of the receptacle is directly exposed to the heat rising immediately from the fire and that the thimble 1 confines the heat from the fire to the oval surface, thus increasing the heating effect. The area of the exposed surface of the receptacle 3 being much greater than the area represented by the lower end of the thimble, a large increase in heating effect is obtained over that which would result with an ordinary flat-bottomed pot of the same size.

The bottom of thimble 1 may have a roll or bead 8 which is adapted to fit within the shoulder 9 of the stove-top-hole, serving to hold the utensil in place and to effectually close the opening. The bottom portion of receptacle 3 being rounded or oval-shaped it can be cheaply manufactured without the use of joints, and will stand the heat better than a jointed bottom. It is, moreover, easier to clean on the inside than the ordinary flat-bottomed pot.

In some cases it is desirable to make the receptacle detachable from the thimble; for example, to facilitate cleaning of the parts. For this purpose the thimble indicated at 11 may have an inturned flange 10, see Fig. 2, at its upper end, and the receptacle indicated at 13 has a shoulder 12 adapted to rest on said flange, and projections or lugs 14 adapted to pass through notches 15 in said flange when the receptacle is inserted within the thimble. On then turning the receptacle within the thimble these projections are caused to pass under the flange 10, see Fig. 2ª, to hold the parts firmly together. Another form of detachable connection of the parts is shown in Fig. 3, the thimble indicated at 21 being split or slit at its upper end, as indicated at 22, to render it elastically dilatable and having inturned projections or bead portions 24 adapted to engage in an annular groove or seat 25 in the receptacle indicated at 23, these projections snapping into said seat when the receptacle is inserted in the thimble. This construction makes it possible to easily separate the parts to more readily clean the appliance, the bead portions 24 springing into and out of the groove or seat 25 in the receptacle as the parts are fastened together or separated. The tapering oval bottom 33 of the receptacle enables the cook to center the receptacle quickly into the top of the heat-collector and crowd said receptacle firmly into position to be held securely in place by the dilatable resilient sections between slits 22.

It will be understood that the invention is not limited to any particular shape of the receptacle, or to any particular use thereof, as it may be used with obvious modifications as a heating vessel for any purpose.

What I claim is:—

1. A utensil comprising a receptacle having an annular groove and a thimble connected to the receptacle and extending down and around but out of contact with the receptacle, said thimble being split at its upper end to render it dilatable and having an inturned bead adapted to engage in said annular groove in the receptacle.

2. A utensil comprising a receptacle having a tapered bottom portion, an annular groove above said portion and a thimble connected to the receptacle and extending down and around but out of contact with the receptacle, said thimble being split at its upper end to render it dilatable and having an inturned bead adapted to engage in said annular groove in the receptacle.

3. A utensil comprising a receptacle having an oval lower portion, an annular groove, and a thimble connected to and extending down, around and out of contact with the thimble, said thimble being split at its upper end to render it dilatable and having an inturned bead adapted to engage in said annular groove in the receptacle.

4. A utensil comprising a receptacle having a rounded bottom portion, an annular groove, and a downwardly-flaring thimble connected at its upper end to said receptacle, said thimble being split at its upper end to render it dilatable and having an inturned bead adapted to engage in said annular groove in the receptacle.

5. A utensil comprising a receptacle having an annular groove, and a thimble detachably connected thereto and extending down and around but out of contact with the lower portion of the receptacle, said thimble being split at its upper end to render it dilatable and having an inturned bead adapted to engage in said annular groove in the receptacle.

6. A utensil comprising a receptacle having a rounded bottom portion, an annular groove, and a downwardly-flaring thimble detachably connected at its upper end to said receptacle, said thimble being split at its upper end to render it dilatable and having an inturned bead adapted to engage in said annular groove in the receptacle.

In testimony whereof, I have hereunto set my hand at San Diego, California, this 21st day of October, 1904.

CHARLES W. JACKSON.

In presence of—
Geo. F. Mahler,
A. E. Dodson